Sept. 1, 1964 W. S. EVERETT 3,146,796
FLUID PULSATION DAMPENER
Filed Oct. 11, 1961 2 Sheets-Sheet 1

INVENTOR.
WILHELM S. EVERETT
BY
Elliott & Pastoriza
ATTORNEYS

Sept. 1, 1964 W. S. EVERETT 3,146,796
FLUID PULSATION DAMPENER

Filed Oct. 11, 1961 2 Sheets-Sheet 2

INVENTOR.
WILHELM S. EVERETT
BY
Elliott & Pastoriza
ATTORNEYS

United States Patent Office 3,146,796
Patented Sept. 1, 1964

1

3,146,796
FLUID PULSATION DAMPENER
Wilhelm S. Everett, 806 Railroad Ave.,
Santa Paula, Calif.
Filed Oct. 11, 1961, Ser. No. 144,456
8 Claims. (Cl. 138—26)

This invention generally relates to fluid pulsation dampeners for the control of fluid surges and pulsations, and it more particularly concerns a dampener designed for diversified applications to meet the requirements of various pressure surge limits, for example, as may characterize low pressure residential water lines or high pressure jet fluid lines.

The fluid surge dampener of the present invention will be described from the standpoint of its application to a tank fueling system, although it will be appreciated that the dampener may equally well be applied to other analogous applications in which a sudden fluid surge or pressure is built up in a fluid line as the result of a valve closure or the like. Thus, the fluid surge dampener of the present invention may also be termed a device for the suppression of water hammer, for example.

Most conventional fluid surge dampening devices embody some type of moving part or parts which are subject to fatigue or failure. Others involve synthetic products which may deteriorate upon contact with certain fluids passing through the line. Still other dampening devices available on the market are of too large a size to meet the needs of many applications or are not subject to precise engineering design to match the surges and fluid viscosities characterizing the lines to which they are to be applied.

It is, therefore, an important object of the present invention to provide an improved fluid surge and pulsation dampener which is not subject to fatigue or wear and which will not require any appreciable maintenance over a long period of life.

Another object of the present invention is to provide a fluid surge dampener which does not embody any synthetic materials or other materials which may deteriorate by contact with various fluids, such as gasoline, oil, or the like which may be flowing through the line to which the dampener is coupled.

Still another object of the present invention is to provide a fluid surge dampener which may be constructed of relatively small overall dimensions, and yet which may be precisely sized to match the fluid and range of surges anticipated in the line to which it is to be connected.

Still a further object of the present invention is to provide a fluid surge dampener which may be economically constructed of a minimum number of parts, and yet which may be conveniently fabricated on a production line basis.

These and other objects and advantages of the present invention are generally achieved by providing a fluid surge dampener designed for connection in a conduit which is subject to surges; and, in which the fluid surge dampener is generally comprised of a closed vessel, and means defining a swirl chamber disposed in the vessel which will enable circular movement of fluid in a free vortex. The swirl chamber also includes a center opening and at least one tangentially directed peripheral opening communicating between the chamber and the interior of the vessel. A supporting means or member is disposed to retain the chamber in position within the vessel.

A venturi section is formed in the conduit to create a low pressure area therein, and a passage means communicates between the venturi section and the center opening of the swirl chamber. In consequence, in response to an increased pressure in the conduit, fluid will flow from the conduit through the passage means and center opening of the swirl chamber into the swirl chamber and thereafter outwardly through the peripheral opening thereof into the interior of the vessel. On the other hand, during normal flow, the venturi section will create a low pressure area which will tend to draw fluid that is in the vessel back down through the swirl chamber and passage means into the main conduit.

Another fluid line communicates between the interior of the vessel and a source of low pressure gas or gases. A vacuum relief valve is interposed in this latter conduit such that withdrawal of fluid from the vessel will act to open the valve and draw into the vessel the low pressure gases. On the other hand, in response to a pressure surge in the main line such as to cause fluid to enter into the vessel, the valve will be closed whereby the gas will cushion the surge and the fluid flowing back out of the swirl chamber will have at least a part of its surge energy absorbed.

A better understanding of the present invention will be had by reference to the drawings, showing merely one illustrative embodiment, and in which.

Figure 1:
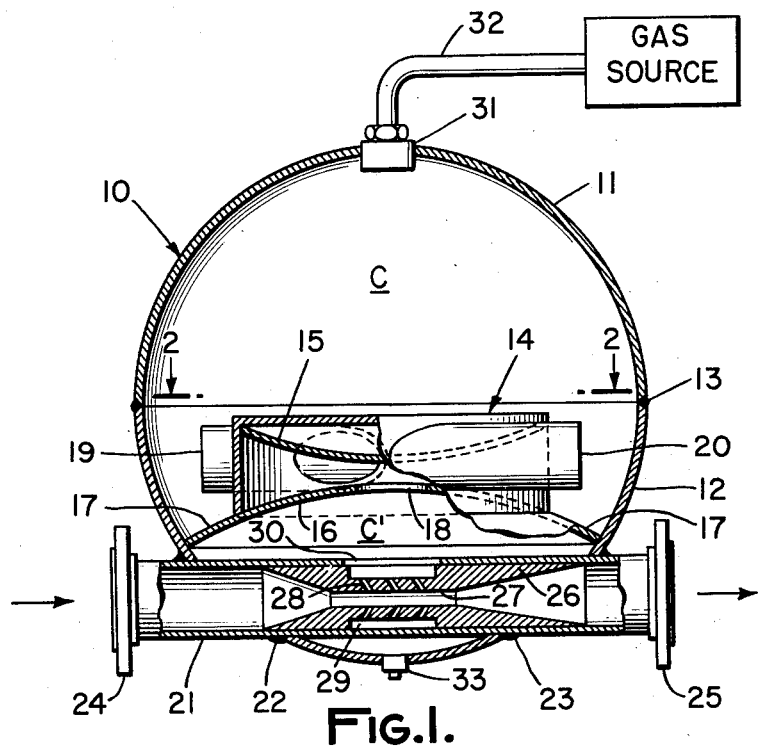
FIGURE 1 is a sectional view, partially schematic, through the fluid surge dampener of the present invention.

Referring now to the drawings, there is shown in FIGURE 1 a spherical chamber or vessel 10, preferably comprised of two hemispherical sections 11 and 12 which are welded together, as at 13.

As an important feature of the present invention, there is disposed within the vessel 10 a swirl chamber generally designated by the numeral 14 which is partially defined by opposing concave end walls 15 and 16. The end wall 16 extends outwardly beyond the chamber to define an annular rim portion 17 which supports the chamber 14 from the sidewalls of the hemispherical section 12 of the vessel 10. The rim 17 also defines with its integral end wall 16 and vessel 10 a partition separating the vessel 10 into two chambers C and C', the functions of which will be clearer as the specification proceeds.

An opening 18 is provided in the lower end wall 16, which communicates between the lower side of the end wall 16 or chamber C' and the interior of the swirl chamber 14, as viewed in FIGURE 1. Preferably, the swirl chamber 14 has circular sidewalls, as clearly shown in the view of FIGURE 2.

Figure 2:
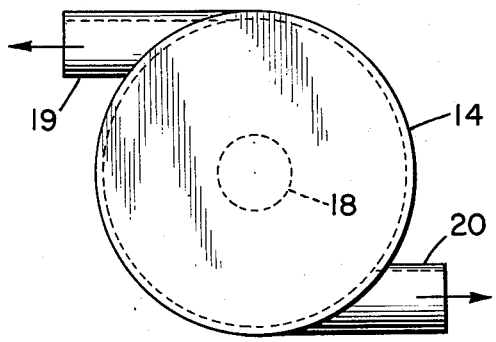
FIGURE 2 is a view taken in the direction of the arrows 2—2 of the swirl chamber of FIGURE 1.

The swirl chamber 14 is also provided with peripheral tangential openings 19 and 20 as shown in the view of FIGURE 2.

A conduit or pipe 21 extends through the lower portion of the hemispherical section 12 and may be sealably welded, for example at 22 and 23, to the cut-away portions of the section 12. Coupling joints 24 and 25 may be connected on the opposing ends of the conduit 21 for connection into the fluid line to which the dampener is to be applied, a typical installation being described later in the specification.

The conduit 21 has formed therein a venturi section 26 which defines a reduced internal diameter area 27. Ports or openings 28 communicate between the low pressure area defined at 27 and an annular recess 29 around the venturi section 26. The recess 29 in turn communicates through an opening 30 in the conduit 21 to the chamber C' below the swirl chamber 14. In consequence, the ports 28, the recess 29, the opening 30, the lower side of the partition 16–17, or chamber C', and the opening 18 define a passage means communicating between the low pressure area 27 of the conduit 21 and the interior of the swirl chamber 14 through opening 18.

Connected to the upper portion of the hemispherical section 11 on the vessel 10 is a vacuum relief valve 31 which communicates through a fluid line 32 to the gas source indicated. In most applications, the line 32 will merely communicate with atmosphere. However, in certain instances, it may be desirable to have the line 32 communicate with a source of particular gas, especially under conditions in which there is any possibility of mixture of the gas and the fluid traveling through conduit 21.

A drain cock 33 may be provided in the lower end of vessel 10 for mainteance, if ever required.

Figure 3:
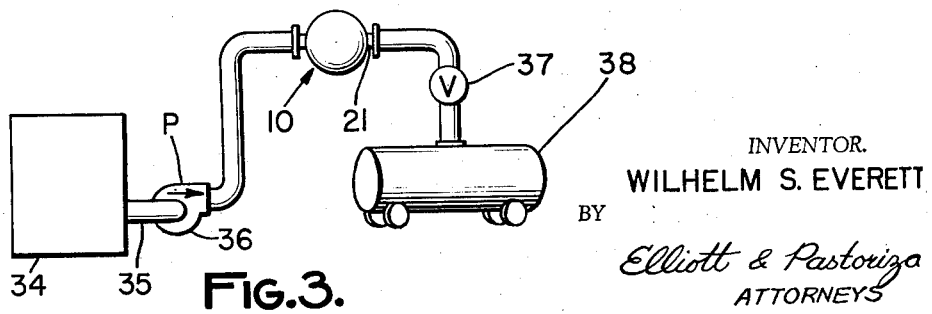
FIGURE 3 is a schematic representation of a typical installation of the fluid surge dampener of the present invention.

The operation of the improved fluid surge dampener according to the present invention may be clearly described by considering an illustrative installation, for example as shown in FIGURE 3. Thus, there is shown in FIGURE 3 a main reservoir or tank 34 to which a fluid outlet line 35 is connected having interposed therein a pump 36. Downstream of the pump 36 is a surge dampener 10, according to the present invention, and downstream of the surge dampener 10, as such, is a main valve 37. The line 35 may connect at its outlet with a tank truck 38, for example, which may be used in marketing bulk plants, for oil companies or in conjunction with jet fueling systems. In the schematic representation of FIGURE 3, the line 32 is not shown; however, in such instance, it might be desirable to have the line 32 lead to a low pressure vapor tank of the particular fluid being pumped such that intermixture of the vapor and fluid will not be harmful or create the possibility of fire, for example. However, where water is being pumped or other less flammable fluids are being pumped, the line 32 would be preferably open to atmosphere.

In any event, during usual pumping operations, fluid would normally be drawn from the vessel 10 as a consequence of a low pressure area being created at 27 in view of the venturi section 26. Thus, it would be desirable to have the venturi section 26 designed to create a pressure lower than atmosphere in the area 27. As a result, fluid drawn from the vessel 10 would be replaced by the air or gas from the gas source through the line 32 upon automatic opening of the low pressure or vacuum relief valve. Of course, during such conventional pumping operations, referring to the view of FIGURE 3, the pump 36 would be operating, and the valve 37 would be open.

Upon closure of the valve 37, it will be appreciated that a sudden fluid pressure would build up in the line 35 in which the fluid surge dampener 10 of the present invention is shown interposed. Thus, fuel would be caused to enter through ports 28, recess 29, opening 30, and thereafter through the area below partition 16–17 or chamber C', through the opening 18 into the swirl chamber 14 and thereafter outwardly through ports 19 and 20 of the swirl chamber into chamber C of the vessel 10 in the volume above the partition 16–17 unoccupied by the swirl chamber 14.

Of course, as soon as the fluid commenced entering the vessel 10, the pressure of the gases or air therein would build up and close the valve 31. The air or gases would continue to be compressed until the pressure thereof was greater than the surge pressure of the fluid entering through the ports 28. Thereafter, the fluid would start returning back through the swirl chamber 14 from chamber C by entering the tangentially directed ports 19 and 20. In consequence, a free vortex movement would be created within the swirl chamber 14. Of course, because of viscous effects or fluid friction, a true free vortex would not characterize the entire movement of the fluid from the peripheral ports 19 and 20 to the center or axial opening 18. The fluid reaches its peak velocity by gradual radially decreasing circumferential movement before losing its energy through turbulence after finally passing out through the opening 18 to chamber C', and thereafter through the port 17, recess 29, and openings 28 back into the fluid line 21.

By knowing the particular viscosity of the fluid passing through the line 35 and the range of surge pressures, it is possible to design the swirl chamber 14 and the venturi section 26 such as to achieve maximum surge alleviation and most effective dampening of surges that may be created.

It will be noted that the end walls 15 and 16 of the surge chamber 14 are concave in shape, as heretofore mentioned. By making the end walls of this shape, not only is greater structural stability given to the swirl chamber 14, but the end walls 15 and 16 also tend to create more and more fluid friction as the fluid moves from the peripheral ports 19 and 20 to the center axial opening 18 after a surge of fluid has passed into the vessel 10 and is returning back to the line 35.

It is, of course, essential that the fluid not bypass the swirl chamber 14 as it returns to the line 35 by conduit 21, in the view of FIGURE 1. Thus, the swirl chamber 14 must actually be in series with the chambers C and C' of the vessel 10. In another form, a direct conduit could be interposed between the opening 18 and the opening 30 instead of having the end wall 16 terminate in a rim portion 17 to isolate the upper part or chamber C of the vessel 10 from that portion C' below the wall 16–17.

Figure 4:
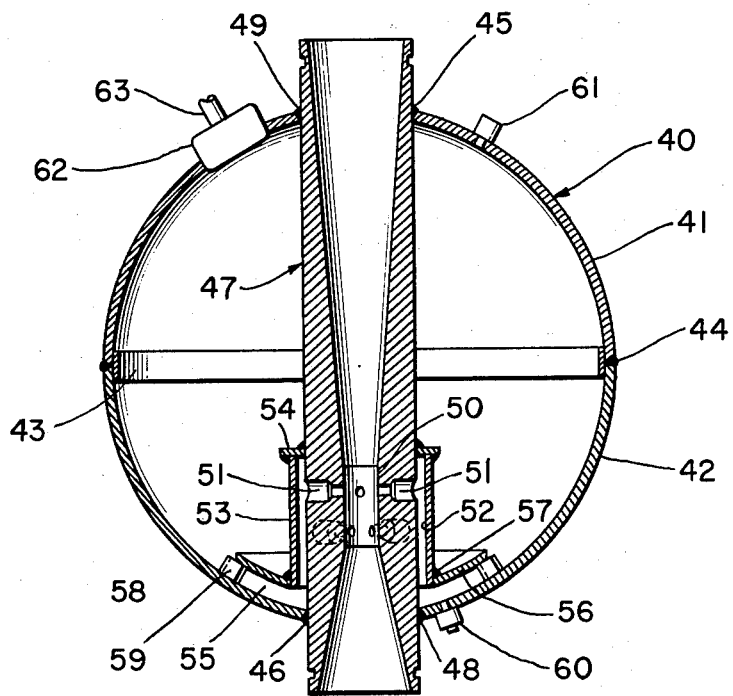
FIGURE 4 is another illustrative embodiment showing the surge dampener constructed for vertical mounting; and, FIGURE 5 is a schematic representation of the dampener in a vertically mounted application.

The fluid pulsation dampener of the present invention may also be varied in construction somewhat to permit it to be mounted in a vertical position. Thus, there is shown in FIGURE 4 a surge dampener embodying the same inventive concept except for certain structural variations.

Thus, a vessel 40 is shown including an upper section 41 and a lower section 42 reinforced by a backing ring 43 and welded together at 44. The upper section 41 is provided with an aperture 45 and the lower section 42 provided with a diametrically opposing aperture 46 such that a conduit or pipe 47 may be passed through the aligned apertures 45 and 46 and welded to the upper section 41 at 48 and the lower section 42 at 49.

As with the embodiment of FIGURE 1, the conduit 47 is provided with a venturi section or area 50 which defines holes 51, which may be counter drilled as shown. The apertures 51 communicate with an annular passage 52 which is encircled by a cylindrical member 53 which has a closure 54 at its upper end welded to the conduit 47.

At the lower end of the cylindrical member 53, the annular passage 52 communicates with a chamber 55 which functions as a swirl chamber in this embodiment.

The chamber 55 is defined by a conduit 47, the lower end of the bottom section 42 of the vessel, a dished annular shaped head 56 welded at 57 to member 53, and a circular sidewall 58.

A plurality of ports or openings are spaced about the periphery of the wall 48 and partially defined by vanes 59 which direct fluid from the interior of the vessel 40 tangentially into the chamber 55.

As with the construction of FIGURE 1, the vessel 40 may be provided with a drain cock 60. Also, a connection for a pressure gauge is indicated at 61. In addition, a vacuum relief valve is indicated at 62 connecting with a fluid line 63 which may lead to a gas source or to atmosphere.

Figure 5:
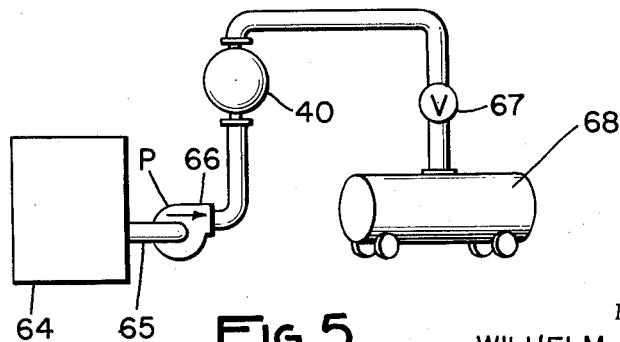

FIGURE 5 illustrates a schematic application of the surge dampener designed for vertical mounting. The application may be similar to that shown in FIGURE 3 with a tank 64 connected to a line 65, which has disposed therein a pump 66. The pump forces fluid upwardly through the dampener 40. Again, the surge dampener 40 is designed to prevent surge pulsations occurring as a consequence of closing of the valve 67.

The operation of the unit is generally similar to that of the unit of FIGURE 1 in that the venturi section 50, because of its low pressure, will draw fluid from the interior of the tank 40 into the line 47 to empty the tank 40 of fluid. In consequence, gas or air will be drawn through the line 63 and the vacuum relief valve 62 into the interior of the chamber 40.

In response to closing of the valve 67, fluid will be forced through the venturi area 50, into the apertures 51, the annular passage 52, the chamber 55, and thereafter out the openings in the wall 58.

At such time that the fluid pressure equals the gas pressure in the vessel 40, the fluid will be forced back through the vaned openings 59 to swirl about the periphery of the chamber 55, gradually decreasing in radius until it enters upwardly through passage 52 to dissipate its energy therein and flow back into conduit 47 through openings 51.

It will be appreciated that although the swirl chamber 55 of FIGURES 4 and 14 of FIGURE 1 represent important features of the present invention; these chambers may be replaced by structures performing equivalent functions. In other words, the purpose of the swirl chamber 14 or 55 is to perform the function of a differential fluid friction structure. Thus, the swirl chamber—of FIGURE 4, for example—enables fluid to flow in response to a pressure surge relatively freely into the chamber 40; however, the swirl chamber limits flow back to the line by causing the momentum and the energy of the fluid to be dissipated in the annular passage 52.

In consequence, although it is preferred to use a swirl chamber according to the present invention, it will be appreciated that the venturi section employed may also be used with other devices functioning to create differential fluid friction.

It will be appreciated that the surge dampener of the present invention may be made entirely of metal or plastic with no moving parts. Furthermore, it may be constructed of small overall dimensions to meet limited space requirements, and it may be precisely engineered to meet the particular surge and fluid requirements. The only part requiring maintenance would be the vacuum relief valve which could be readily replaced if necessary without disassembly of the remainder of the apparatus.

The surge dampener is not to be thought of as limited to the particular illustrative embodiments shown but to embody all structures or modifications which fall within the scope of the invention as set forth in the following claims.

What is claimed is:

1. A fluid surge dampener for connection in a conduit subject to surges, said fluid surge dampener comprising: a closed vessel; a venturi section formed in said conduit to create a low pressure area therein; differential fluid friction means supported in said vessel; first passage means communicating between said venturi section and said differential fluid friction means, said fluid friction means opening to said vessel and enabling greater fluid flow in one direction from said conduit to said vessel than in an opposite direction from said vessel to said conduit; a second passage means communicating between the interior of said vessel and a source of air or gas; a vacuum relief valve interposed in said second passage means, whereby withdrawal of fluid from said vessel will act to open said valve and draw said air or gas therethrough and into said vessel, and whereby entry of fluid into said vessel in response to a pressure surge in said conduit will maintain said valve closed such that said air or gas will cushion said surge and said swirl chamber will absorb part of the energy therefrom.

2. A fluid surge dampener for connection in a conduit subject to surges, said fluid surge dampener comprising: a closed vessel; means defining a swirl chamber disposed in said vessel, said means being designed to effect circular movement of fluid in a free vortex, and said means defining a central opening, and at least one tangentially directed peripheral opening communicating between said chamber and the interior of said vessel; means supporting said chamber in said vessel; a venturi section formed in said conduit to create a low pressure area therein; passage means communicating between said venturi section and said central opening; a gas line communicating between the interior of said vessel and a source of low pressure gas; a vacuum relief valve interposed in said gas line, whereby withdrawal of fluid from said vessel will act to open said valve and draw said low pressure gas therethrough and into said vessel, and whereby entry of fluid into said vessel in response to a pressure surge in said conduit will maintain said valve closed such that said gas will cushion said surge and said swirl chamber will absorb part of the energy therefrom.

3. A fluid surge dampener for connection in a conduit subject to surges, said fluid surge dampener comprising: a closed spherical vessel; means defining a swirl chamber disposed in said vessel, said means being designed to effect circular movement of fluid in a free vortex, and said means defining a central opening, and at least one tangentially directed peripheral opening communicating between said chamber and the interior of said vessel, and said means also defining opposing concave end walls for said swirl chamber, one of said concave end walls extending radially outwardly to sealably connect with the interior of said vessel so as to form a partition across said vessel; a venturi section formed in said conduit to create a low pressure therein; passage means communicating between said venturi section and said central opening, said passage means being partially defined by a portion of said vessel on one side of said extended concave end wall; a fluid line communicating between the interior of said vessel on the other side of said extended concave end wall and a source of low pressure gas; a vacuum relief valve interposed in said fluid line, whereby withdrawal of fluid from said vessel will act to open said valve and draw said low pressure gas therethrough into said vessel and whereby entry of fluid into said vessel in response to a pressure surge in said conduit will maintain said valve closed such that said gas will cushion said surge and said swirl chamber will absorb part of the energy thereof.

4. A fluid surge dampener, according to claim 2, in which said vessel is provided with openings on a chord line thereof through which said conduit extends and is sealably connected.

5. A fluid surge dampener for connection in a conduit subject to surges, said fluid surge dampener comprising: a closed spherical vessel; a length of pipe extending through said vessel and sealably, rigidly connected thereto so as to form a unified structure therewith; a generally cylindrically swirl chamber disposed within the interior of said vessel, said swirl chamber having opposing concave end walls, one of said concave end walls being extended to connect with the interior sidewalls of said vessel so as to define an inner partition within said vessel, said extended concave end wall having a central axial opening therein; at least one peripheral inlet opening to said swirl chamber; a venturi section formed in said length of pipe disposed within said vessel so as to create a low pressure area in said pipe in response to fluid flow therethrough; passage means communicating from said venturi section through said pipe to the interior of said vessel; a fluid line communicating between the interior of said vessel and a source of low pressure gas; a vacuum relief valve interposed in said fluid line whereby withdrawal of fluid from said vessel will act to open said valve and draw said low pressure gas therethrough into said vessel and whereby entry of fluid into said vessel in response to a pressure surge will maintain said relief valve closed such that said gas will cushion said surge and said swirl chamber will absorb a part of the energy thereof.

6. A fluid surge dampener for connection in a conduit subject to surges, according to claim 4, in which at least two peripheral tangential openings communicate between said swirl chamber and the interior of said vessel to direct fluid in the same rotational direction.

7. A fluid surge dampener for connection in a conduit subject to surges, said surge dampener comprising: a closed vessel; a cylindrical chamber in said vessel having a peripheral opening and an end opening; a structure supporting said chamber in said vessel; a venturi section formed in said conduit; passage means sealed from said vessel and communicating from said venturi section to said end opening; a fluid line communicating between said vessel and a gas source; and, a vacuum relief valve interposed in said line.

8. A fluid surge dampener, according to claim 6, in which said cylindrical chamber has one end wall sealably connecting with the interior of said vessel to form a partition therein, and in which said end opening is formed in said one end wall.

References Cited in the file of this patent
UNITED STATES PATENTS

| | | |
|---|---|---|
| 2,139,736 | Durham | Dec. 13, 1938 |
| 2,671,652 | McCullough | Mar. 9, 1954 |
| 2,896,862 | Bede | July 28, 1959 |
| 2,942,684 | Bennett | June 28, 1960 |
| 3,018,799 | Volkmann et al. | Jan. 30, 1962 |